United States Patent [19]

Noguchi et al.

[11] 3,822,466

[45] July 9, 1974

[54] AUTOMATIC TOOL EXCHANGER FOR LARGE-SCALED FLOOR-TYPE HORIZONTAL BORING MACHINES

[75] Inventors: Akio Noguchi; Shinsuke Tsuda, both of Hiroshima, Japan

[73] Assignee: Mitsubishi Jukogya Kabushiki Kaisha, Tokyo, Japan

[22] Filed: Mar. 14, 1972

[21] Appl. No.: 234,545

[52] U.S. Cl.............. 29/568, 214/1 BB, 214/1 BD
[51] Int. Cl........................................... B23q 3/157
[58] Field of Search........... 29/568; 214/1 BD, 1 BB

[56] References Cited
UNITED STATES PATENTS

| | | | |
|---|---|---|---|
| 3,300,856 | 1/1967 | Daugherty | 29/568 |
| 3,412,459 | 11/1968 | Hdlis | 29/568 |
| 3,546,774 | 12/1970 | Stoferle et al. | 29/568 |
| 3,551,984 | 1/1971 | Goebel et al. | 29/568 X |
| 3,584,374 | 6/1971 | Spuhler | 29/568 |
| 3,591,920 | 7/1971 | Brainsed et al. | 29/568 |
| 3,691,655 | 9/1972 | Kurimato et al. | 29/568 |

*Primary Examiner*—Andrew R. Juhasz
*Assistant Examiner*—Z. R. Bilinsky
*Attorney, Agent, or Firm*—McGlew and Tuttle

[57] ABSTRACT

A floor-mounted horizontal boring machine includes an elongated horizontal base, a slide mounted on the base for reciprocation longitudinally thereof, an upright column fixedly mounted on the slide adjacent one end thereof, and a main spindle head mounted on a front end wall of the column for vertical and lateral adjustment relative thereto. An automatic tool exchanging apparatus includes a tool magazine fixedly mounted on the slide adjacent a rear end wall of the column so that the column is interposed horizontally between the main spindle head and the magazine. A carriage is mounted on rails on a horizontally extending vertical front surface of the slide for horizontal reciprocation past a sidewall of the column between the main spindle head and the tool magazine, and an automatic tool exchanger is mounted on the carriage for tool exchange in cooperation with the main spindle head, in one limit position of the carriage, and with the tool magazine, in the other limit position of the carriage. The carriage is normally retracted to a position adjacent the magazine where the tool exchanger positions a used tool in the magazine and extracts a new tool from the magazine. When a tape control or the like calls for a tool exchange, the carriage is moved to an extended position adjacent the main spindle and the automatic tool exchanger extracts a tool from the main spindle and mounts a new tool in the main spindle, after which the carriage is retracted to a position adjacent the tool magazine.

7 Claims, 8 Drawing Figures

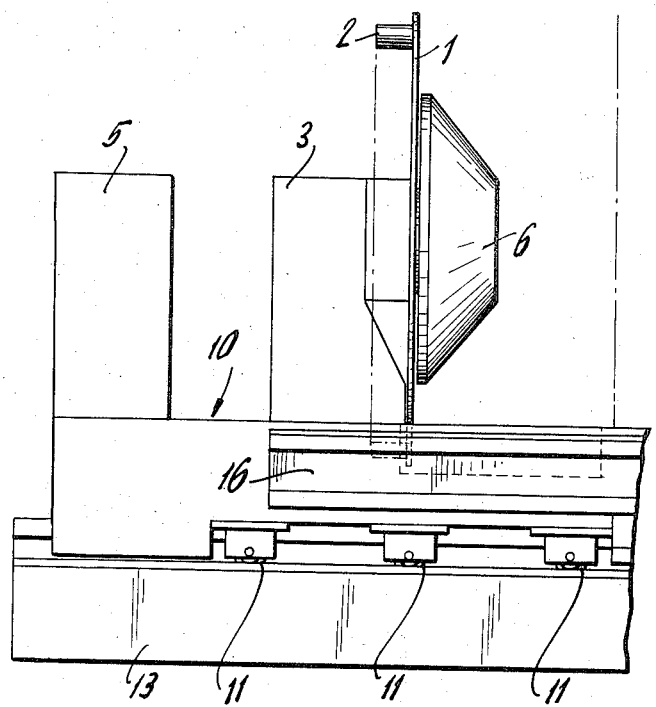
FIG. 2
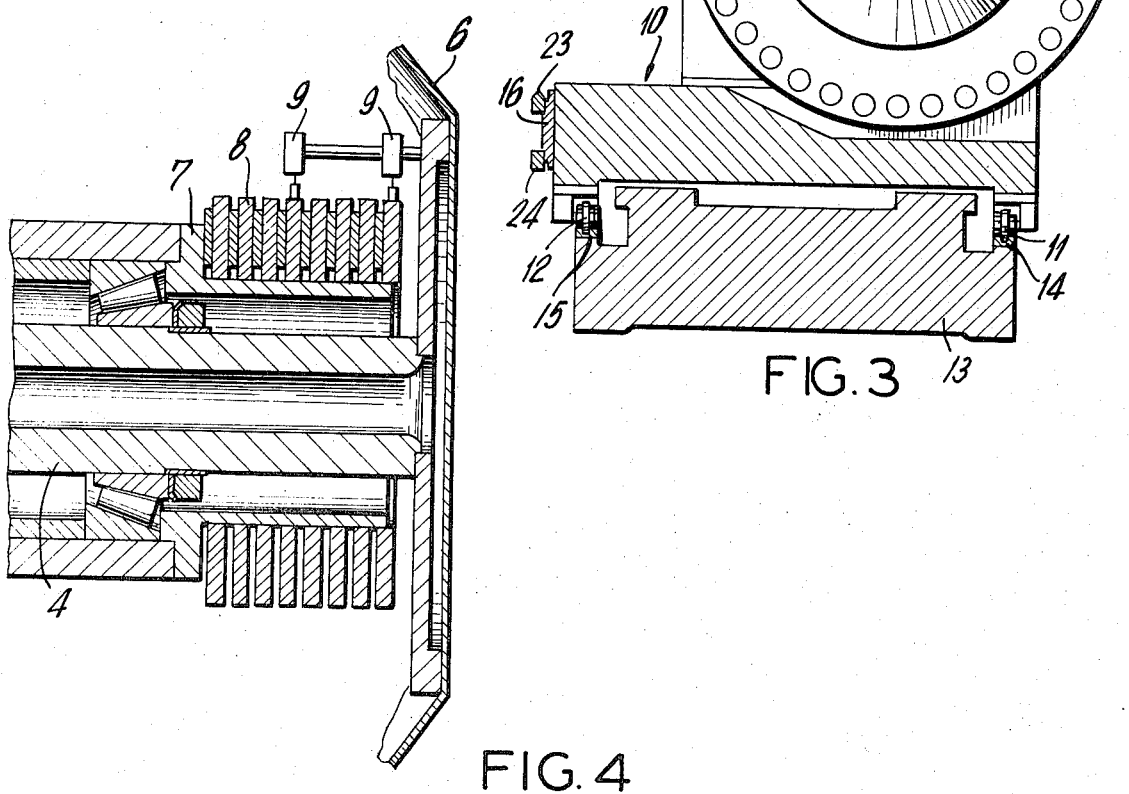
FIG. 3
FIG. 4

AUTOMATIC TOOL EXCHANGER FOR LARGE-SCALED FLOOR-TYPE HORIZONTAL BORING MACHINES

FIELD AND BACKGROUND OF THE INVENTION

The present invention relates to an automatic tool exchanger for large-scale floor-type horizontal boring machines, in which all components of the exchanger are disposed on one side of the machine opposite to an operator's table, to avoid all interference with an operator and an article to be worked.

Heretofore, as an automatic tool exchanger available in machine tools, various exchangers have been developed which are generally of a smaller type and applicable to table type machine tools having a column affixed thereto. Recently, as the articles to be worked have become larger, the machines also have become correspondingly larger, and consequently, for the horizontal boring machines, a floor travel type has been employed. Furthermore, in order to reliably achieve working at various points on many faces through a minimum number of steps, it has become necessary to realize a high precision of the machine tool itself and an automation of operations, as well as means for storing and exchanging many kinds of tools. Still further, because of the increased weight of the tools accompanying the increase in scale of the articles to be worked, it has become very difficult to perform the above-described tool exchange through manual operations. Consequently, as the machine becomes larger, an automatic tool exchanger becomes more necessary. However, due to the facts that the machine body is movable, it was quite difficult to apply prior art tool exchangers per se for this purpose.

In addition, in prior art automatic tool exchangers, the tool magazine and the main spindle head were disposed near to each other, so that it was quite possible that the tool storage may be contaminated by the chips and/or cutting oil drops flying off during the working, and it was very dangerous to carry out checking and/or exchange of the tools during the working.

SUMMARY OF THE INVENTION

An object of the present invention is to provide an automatic tool exchanger for large scale floor-type horizontal boring machines which is free from the above-described disadvantages and which enables exchange of the tools safely and efficiently.

According to the present invention, the automatic tool exchanger for large-scale floor-type horizontal boring machines comprises tool magazine means provided on a slide base member that is movable along with a machine body and disposed on the back side of a column whose front side mounts a main spindle head for selectably accommodating tools, tool carriage support means provided on the front surface of the machine body and extending between the tool magazine means and the main spindle head, and tool exchange means reciprocally movable between the tool magazine means and the main spindle head with the aid of the tool carriage support means for exchanging new and old tools at the main spindle head and for accommodating an old tool and selectively taking out a new tool at the tool magazine means, whereby the tool mounted in the main spindle may be automatically exchanged in accordance with instructions given by an operating board or a numerical control device.

These and other features and advantages of the invention will become apparent from perusal of the following description of a preferred embodiment taken in conjunction with the accompanying drawings.

BRIEF DESCRIPTION OF THE DRAWING

In the drawings:

FIG. 2 is a side elevation view of a tool storage or magazine, FIG. 3 is a front view of the tool storage or magazine, FIG. 4 is an enlarged partial sectional view of the tool storage or magazine.

DESCRIPTION OF THE PREFERRED EMBODIMENTS

Figure 1:
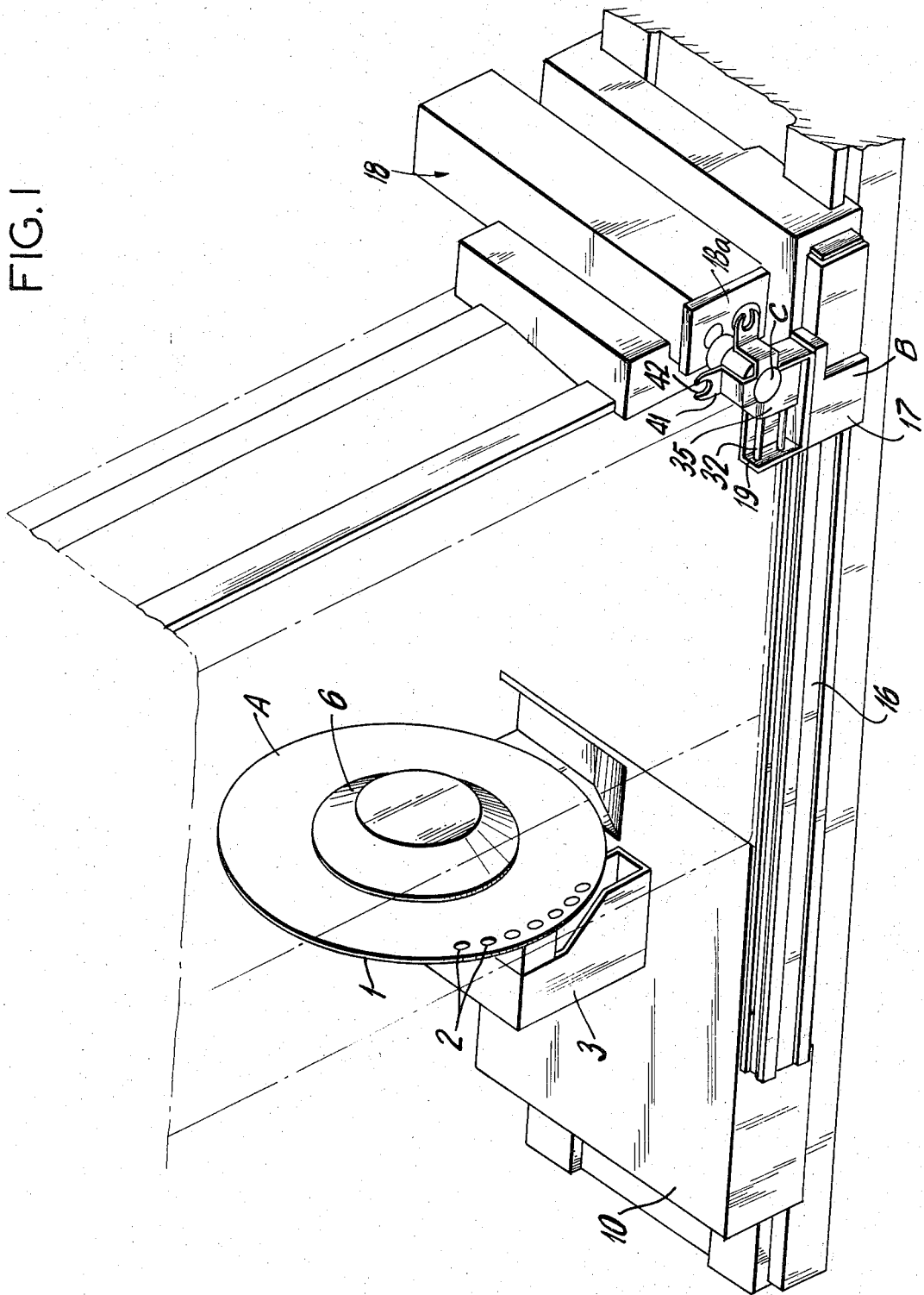
FIG. 1 is a perspective view showing a general structure of the automatic tool exchanger according to one preferred embodiment of the invention.

Referring now to FIG. 1 of the drawings, the automatic tool exchanger according to the present invention comprises three principal components, that is, a tool storage (A) for accommodating the prepared tools, tool carriage means (B) for carrying the tools from the tool storage to the main spindle position of the machine, and tool exchange means (C) for exchanging new and old tools at the main spindle position and for selectively taking out a new tool and accommodating an old tool at the tool storage position. Describing the general structure in more detail with reference to FIG. 1, reference numeral 1 designates a tool receptacle assembly or magazine that is disc-shaped and that is provided with normally 20 to 60 tool receptacles or receivers 2 along its circumference. Reference numeral 3 designates a stand which serves to rotatably support magazine 1 via a fixed shaft 4 (FIG. 4). Reference numeral 5 designates a driving device in which an electric motor associated with reduction gears or a hydraulic motor is mounted together with indexing and stopping means for the tool magazine, and which serves to rotate the tool magazine and to index the tool magazine at the selected tool receptacle 1 with the aid of indexing and stopping means.

Reference numeral 6 designates a signal detector forming part of a tool pot number selecting system, which is mounted on the front surface of the tool magazine 1 through the fixed shaft 4. Around a central shaft 7, which rotates together with the tool magazine 1, are fixedly secured a plurality of cam plates 8, and by means of the combination of these cam plates 8 and microswitches 9 arranged on a fixed plate secured to the end of the fixed shaft 4, signals characteristic of the individual tool pot positions can be taken out. In the case of the signal detector illustrated in FIG. 4, eight cam plates 8 and correspondingly eight microswitches 9 are used, so that 79 different combinations can be discriminated and it is possible to detect one tool receptacles position out of Nos. 1 to 79 positions. In general, in a tool magazine 1, 20 to 60 tool receptacles are provided along the circumference of a disc-shaped body. However, if the number of tools is still larger, such a magazine can be replaced by a chain-like connection of a plurality of individual tool receivers or receptacles. In either case, the tool magazine 1 is driven by a hydraulic motor or an electric motor to achieve the selection of the tool receptacle. Then the selection system may be either a tool receptacle number selection system, in which the tool receptacle can be selected by a number characteristic of the individual tool pot 2, or a code key system.

Reference numeral 10 designates a slide base member, on which are fixedly mounted the signal detector 6 forming part of the tool receptacle number selection system, stand 3 provided with tool magazine 1, and driving device 5 having an electric motor associated with reduction gears or a hydraulic motor and indexing and stopping means, for the tool magazine accommodated therein. The slide base member 10 has a plurality of rollers 11 and 12 rotatably mounted at its bottom so as to roll along rails 14 and 15 provided on the opposite sides of the head 13 of the machine body. Since the slide base member 10 is constrained with respect to its lateral displacement owing to the rollers 11 fitted in a groove of the rail 14 on one side, the slide base member 10 can be reliably coupled to the machine body and also it can travel smoothly and accurately on the machine body. Reference numeral 16 designates another guide rail means which serves as a carrying path or support, for tool exchange means (C), that is independent of the machine body.

Figure 5:
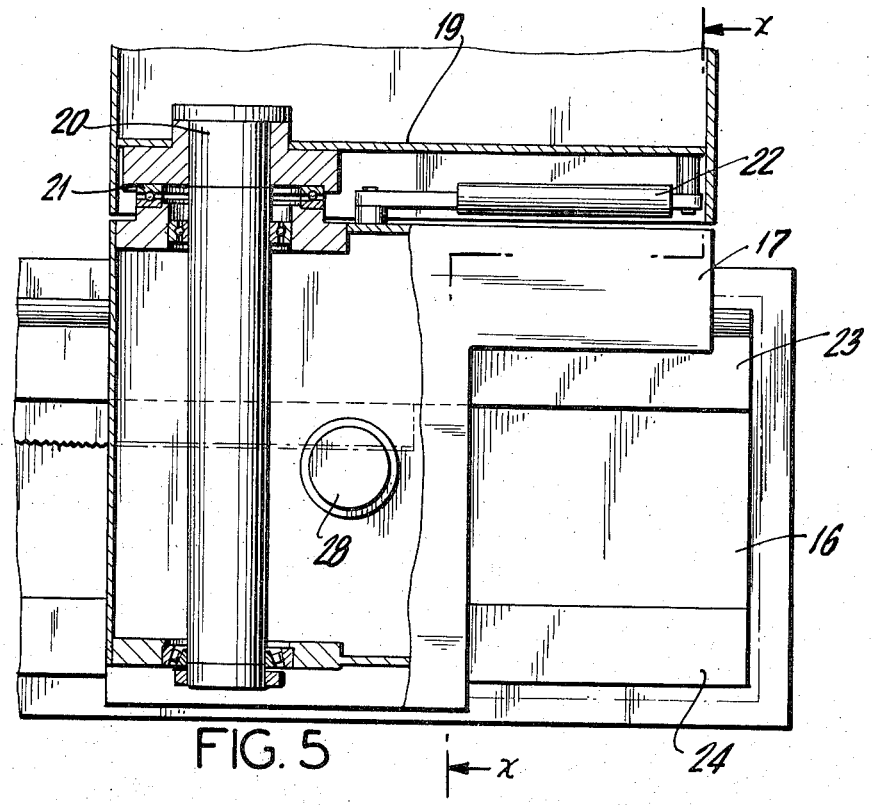
FIG. 5 is a front view, partially broken away, illustrating the structure of a tool carriage means.
Figure 6:
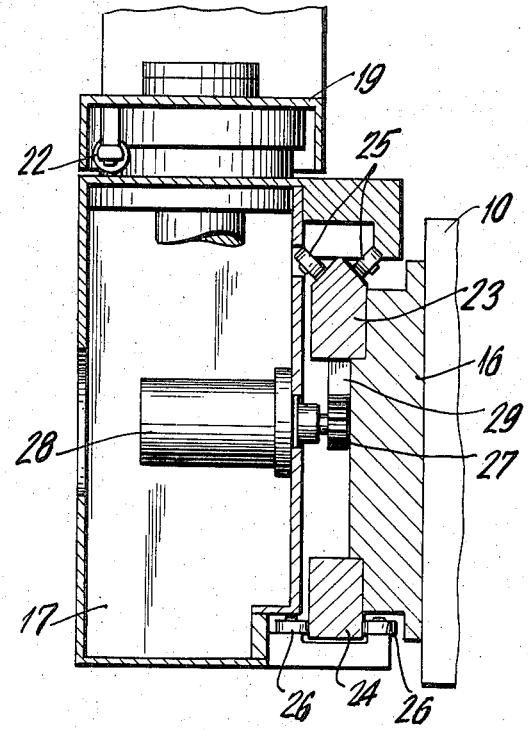
FIG. 6 is a cross-sectional view on the line x—x of FIG. 5.
Figure 7:
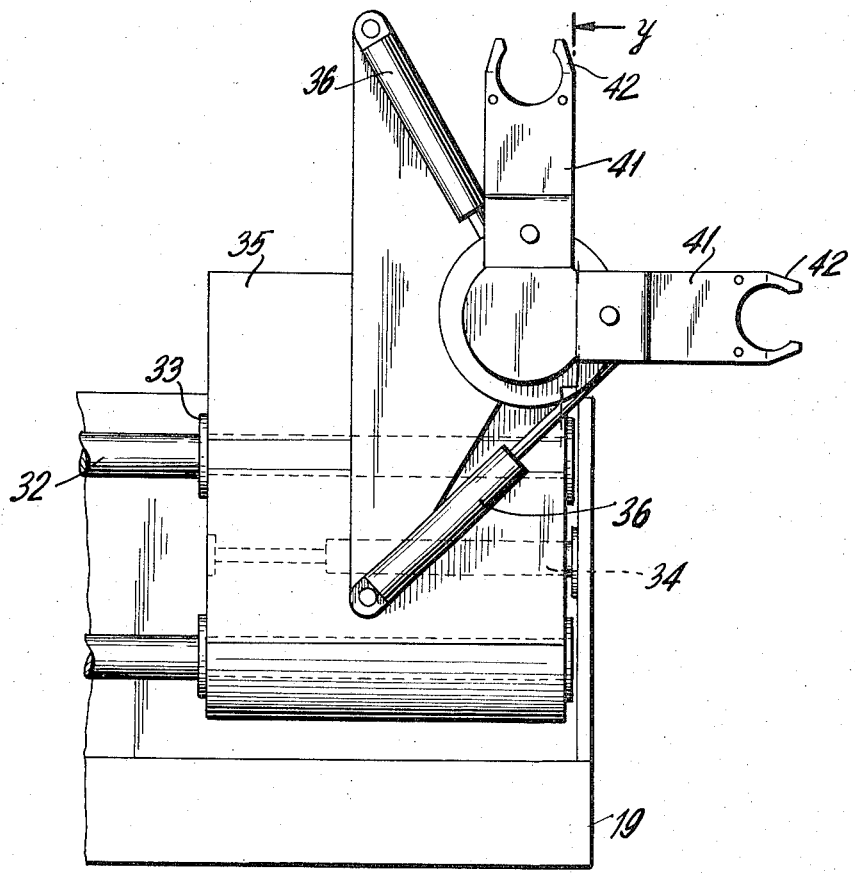
FIG. 7 is a front view illustrating the detailed structure of the tool exchange means of the apparatus shown in FIG. 1.
Figure 8:
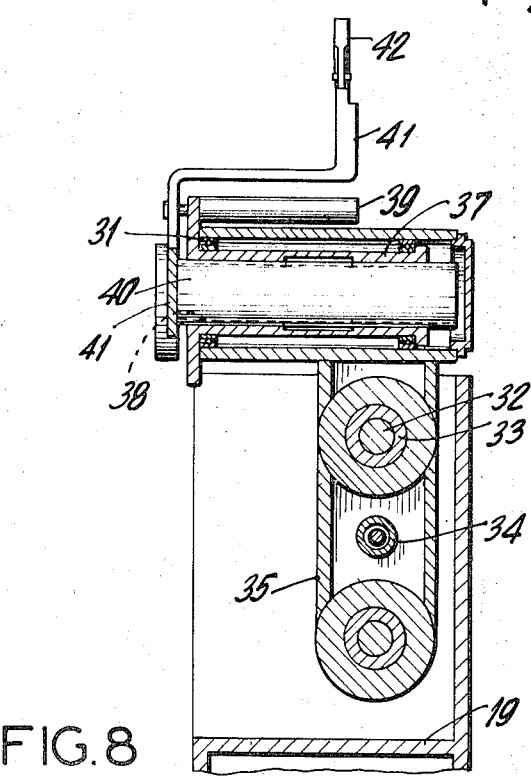
FIG. 8 is a cross-sectional view taken on the line y—y of FIG. 7.

The carriage means (B) consists of guide rail means 16 and a tool carriage 17 (FIGS. 5 and 6) that is reciprocally movable along the guide rail means, and guide rail means 16 is mounted on a side surface of slide 10 extending between tool magazine assembly 1 and the main spindle head 18a of the main spindle 18 of the machine. In addition, on the tool carriage 17 are provided a rotary shaft 20 for rotating a stand 19 affixed thereto at an upper position, a pair of bearings 21 and a hydraulic cylinder 22 serving as a driving source for rotating stand 19. Reference numerals 23 and 24 designate upper and lower rails, respectively, of rail means 16, and which are mounted adjacent the upper edge portion and the lower edge portion of the inner side of the carriage 17, respectively. The inside surface of each rail is engaged with the outside surface of the guide rail means 16. These rails 23 and 24 are made of quenched special steel in order to maintain the sliding surfaces thereof with a high precision despite frequent travelling of a heavy body thereon. Reference numerals 25 and 26 designate upper and lower rollers, respectively, which are mounted on the inner side of the carriage 17, each consisting of two rollers adapted to roll along the upper rail 23 or the lower rail 24 while engaging with the opposite sides of the top of the upper rail 23 or the side portions of the lower rail 24. The upper rollers 25 roll along inclined surfaces of a triangular edge formed on the upper rail 23 while engaging therewith at corresponding angles, and the lower rollers 26 roll along vertical surfaces of the lower rail 24 while engaging therewith from the opposite sides as supported in horizontal positions. Thus the bearing of the weight of the carriage 17, as well as the constraint with respect to vertical displacement, are achieved by the upper rollers 25, while the constraint with respect to lateral displacement is achieved by the lower rollers 26. Reference numeral 27 designates a pinion that is driven by an electric motor associated with reduction gears, or a hydraulic motor, 28 provided within the tool carriage 17. This pinion is engaged with a rack 29 that is fixedly secured to the bottom surface of the upper rail 24, and thereby pinion 28 travels forth and back along the guide rail 16 via the rails 23 and 24. Consequently, the tool carriage 17 can travel forth and back smoothly along the guide rail means 16 via the upper and lower rollers 25 and 26.

Hydraulic cylinder 22 is disposed between the tool carriage 17 and the stand 19, and through its extension and contraction it rotates shaft 20 which has its lower end portion affixed via a spring to a lower portion of the tool carriage 17 and its upper end portion slidably fitted against relative rotation in the stand 19. Thus the stand 19 can be oscillated about the axis of rotary shaft 20 over a range of 90°.

Tool exchange means (C) comprises a head 35 slidably mounted via bearings 33 on guide bars 32, which are fixedly secured to the stand 19, and reciprocally travelling along the guide bars 32 in response to the extension and contraction of a hydraulic cylinder 34, a sleeve 37 supported by bearings 31 and oscillatable about its axis through 90° in response to the actuation of hydraulic cylinders 36, a center shaft 40 fitted into said sleeve 37, and adapted to be applied with a torque through spline fittings 38, and is reciprocally movable in the axial direction in response to the actuation of a hydraulic cylinder 39, and two arms 41 formed integrally with the center shaft 40 and directed at a right angle to the main spindle head 18a. Reference numeral 42 designates claws mounted at the extremity of the arm 41, which are adapted to securely grip the tools.

In the tool exchange means (C) constructed as described above, during the operation of the machine tool, the tool carriage 17 remains adjacent magazine 1 along the guide rail means 16, and the stand 19 has been rotated about the axis of rotary shaft 20 by 90° due to the actuation of the hydraulic cylinder 22, keeping a stand-by state where the head 35 has selected and grasped the tool to be used in the next step at a position hidden from the front side of the machine body. Then the upwardly directed arm 41 holds a new tool, while the horizontal arm 41 is kept vacant.

When the main spindle 18 is returned to its regular position and it is ready for exchange of the tool, at first the stand 19 rotates by 90°, and subsequently the carriage 17 is displaced by means of the hydraulic motor 28 up to the position opposed to the main spindle head 18a. Following this, when the head 35 has been displaced along the guide bars 32 provided in the stand 19 in response to the actuation of the hydraulic cylinder 34, the claws 42, provided at the extremity of the then horizontal arm 41, grip the tool mounted on the main spindle 18, and the arm 41 stops there. Then starting from this state, the arm 41 having its claws 42 engaged with the tool is advanced in the axial direction of the center shaft 40 in response to the actuation of the hydraulic cylinder 39, cooperating with a tool ejector not shown and accommodated in the main spindle 18, and thereby the old tool is extracted from the main spindle. When the other arm 41 has been rotated by 90° in response to the actuation of the hydraulic cylinders 36 to bring a new tool to the position on the same axis as the main spindle 18, the center shaft 40 is retracted by the actuation of the hydraulic cylinder 39, to thereby insert the new tool held on the other arm 41 into the main spindle 18. It is possible to operate a tool locking device synchronously with the last-mentioned operation of the tool exchange means, for fastening the new tool inserted into the main spindle 18. Then, the head 35 is displaced by the hydraulic cylinder 34 along the guide bars 32, so that the claws 42 on the now horizontal arm 41 are disengaged from the new tool inserted into the main spindle 18. Subsequently, the tool carriage 17 travels along the guide rail means 16 in response to the actuation of the hydraulic motor 20, and when the tool carriage 17 has returned to the position adjacent magazine 1, the stand 19 is rotated by the action of the hydraulic cylinder 22 so as to bring the horizontal arm to a position directed to magazine 1.

During the period from the commencement of the initial operation up to this moment, in the tool magazine 1 a new tool to be used in the further next step has been selected by the signal detector 6 according to the tool receptacle number system and the indexing of the selected tool receptacle has been completed. Subsequently, the head 35 is displaced by the hydraulic cylinder 34 to grip the newly selected tool, and the arm 41 is advanced in the direction of the axis of the center shaft 40 by the actuation of the hydraulic cylinder 39 to extract the tool from the tool magazine 1. In order to avoid interference with the remaining tools in magazine 1, first the head 35 is retracted along the guide bars 32 by the action of the hydraulic cylinder 34, and then the arms 41 are rotated by the action of the hydraulic cylinders 36. Under such a condition, the magazine 1 begins to rotate, and after the tool receptacle where the old tool is to be accommodated has been selected, the selected position is indexed and the magazine 1 is stopped at that position. Thereafter, the head 35 is again displaced and the arms 41 are retracted in the axial direction of the center shaft 40 to insert the old tool held by the now horizontal arm 41 into the selected tool receptacle 2. Then the head 35 is again retracted along the guide bars 32, and thus the entire operation has been completed.

As will be seen from the above description, if the automatic tool exchanger for large-scale floor-type horizontal boring machines according to the present invention is employed, then the tool exchange means travels forth and back between the tool magazine and the main spindle head to enable the exchange between new and old tools at the main spindle and the accommodation of an old tool as well as the selection of a new tool at the magazine, and furthermore, the tools to be mounted in the main spindle can be automatically exchanged in accordance with instructions given by an operating board or a numerical control device, so that it is possible to achieve the exchange between the new and old tools accurately and quickly. In addition, since the tool receptacles are disposed on the side of the column opposite to that mounting the main spindle head, that is, at the position displaced from the article to be worked on the back side of the column, there is no risk that the tool receptacles are contaminated by the chips and/or cutting oil drops flying out during the working, and further it is possible to perform checking and/or exchange of the tools safely even during the working.

What is claimed is:

1. In a large-scale, floor-mounted horizontal boring machine of the type including an elongated horizontal base, a slide mounted on the base for reciprocation longitudinally thereof and having a front upright longitudinal surface, an upright column fixedly mounted on the slide adjacent one end thereof and having upright horizontally extending front and rear end walls spaced longitudinally of the slide, and a main spindle head including a main spindle mounted on the column front end wall for vertical and lateral adjustment relative thereto: automatic tool exchanging apparatus comprising, in combination, a tool magazine fixedly mounted on said slide adjacent said column rear end wall so that said column is interposed horizontally between said main spindle head and said magazine along said longitudinal surface; tool carriage means mounted on said slide front surface for horizontal reciprocation longitudinally thereof, horizontally past a sidewall of said column, between said main spindle head and said tool magazine; and an automatic tool exchanger mounted on said carriage means for tool exchanging cooperation with said main spindle head, in one limit position of said carriage means, and with said tool magazine, in the other limit position of said carriage means; whereby tools accommodated in said main spindle head are exchanged automatically in accordance with a preset program by operating said automatic tool exchanger, in said one limit position of said carriage means, to extract the used tool from said main spindle and to insert a new tool into said main spindle, and moving said carriage means to said other limit position thereof for operation of said automatic tool exchanger to insert the used tool into said magazine and to extract a new tool from said magazine.

2. An automatic tool exchanging apparatus, as claimed in claim 1, in which said tool carriage means comprises a guide rail extending along said front surface of said slide between said main spindle head and said magazine; a tool carriage mounted for displacement along said guide rail; means constraining said tool carriage against vertical displacement relative to said guide rail; and means mounting said tool exchanger on said tool carriage.

3. An automatic tool exchanging apparatus, as claimed in claim 2, in which said constraining means comprises rollers rotatably mounted on said tool carriage and engaging said guide rail.

4. An automatic tool exchanging apparatus, as claimed in claim 2, in which said means mounting said tool exchanger on said tool carriage comprises a vertically oriented shaft supporting said tool exchanger for oscillation in a substantially horizontal plane relative to said tool carriage; actuator means operable to oscillate said tool exchanger through an angle of 90° about the axis of said shaft; and further actuator means operable to reciprocate said tool carriage longitudinally of said guide rail.

5. An automatic tool exchanging apparatus as claimed in claim 1, in which said tool exchanger comprises a stand body; guide bars fixedly mounted in said stand body; a head; bearings slidably mounted on said head on said guide bars; actuator means operable to reciprocate said head longitudinally of said guide bars; and tool gripping means oscillatably mounted on said head for movement into and out of tool engaging position.

6. An automatic tool exchanging apparatus, as claimed in claim 5, including a sleeve mounted for oscillation in said body and extending horizontally and perpendicularly to said guide bars; second actuator means operable to oscillate said sleeve through an angle of 90°; and means mounting said tool gripping means for oscillation with said sleeve.

7. An automatic tool exchanging apparatus as claimed in claim 6, including a center shaft telescoped in said sleeve and restrained against rotation relative thereto, said center shaft being reciprocable axially of said sleeve; third actuator means operable to reciprocate said center shaft; said tool gripping means comprising two arms oscillatable with said center shaft and extending therefrom at right angles to each other; and respective tool gripping claws at the outer end of each arm.

* * * * *